(12) United States Patent
Cao

(10) Patent No.: US 8,580,416 B2
(45) Date of Patent: Nov. 12, 2013

(54) ELECTRONIC DEVICE WITH BATTERY LATCHING ASSEMBLY

(75) Inventor: Bang-Yan Cao, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 431 days.

(21) Appl. No.: 12/912,753

(22) Filed: Oct. 27, 2010

(65) Prior Publication Data
US 2012/0064384 A1 Mar. 15, 2012

(30) Foreign Application Priority Data
Sep. 10, 2010 (CN) .......................... 2010 1 0278289

(51) Int. Cl.
*H01M 2/10* (2006.01)
(52) U.S. Cl.
USPC ............ 429/97; 429/96; 429/100; 455/575.1; 320/114; 361/679.01
(58) Field of Classification Search
USPC ................. 429/96–100; 455/575.1; 320/114; 361/679.01–679.03, 679.55–679.56, 361/679.58
See application file for complete search history.

(56) References Cited

U.S. PATENT DOCUMENTS 5,626,979 A * 5/1997 Mitsui et al. .................... 429/97
2004/0001997 A1* 1/2004 Zatezalo et al. ................ 429/96

* cited by examiner

*Primary Examiner* — Basia Ridley
*Assistant Examiner* — James Lee
(74) *Attorney, Agent, or Firm* — Altis & Wispro Law Group, Inc.

(57) ABSTRACT

An electronic device includes a battery, a main body, and at least one latching assembly. At least one sidewall of the battery defines a positioning hole. The main body defines a battery compartment to receive the battery. The battery compartment includes an opening and at least one first sidewall adjacent to the opening. Each of the at least one latching assembly includes an elastic latching member, a resisting member, and a button. The elastic latching member is mounted in the first sidewall and partially received in the battery compartment. The resisting member is moveably mounted in the first sidewall and abuts the elastic latching member. The button is mounted in the main body and abuts the resisting member.

7 Claims, 5 Drawing Sheets

ELECTRONIC DEVICE WITH BATTERY LATCHING ASSEMBLY

BACKGROUND

1. Technical Field

The present disclosure relates to electronic devices and, particularly, to an electronic device using a latching assembly for a battery.

2. Description of Related Art

For a conventional notebook computer, a latching mechanism is employed to latch a battery to the notebook computer. Although the conventional latching mechanism can satisfy basic requirements, a new latching mechanism for latching the battery is still needed.

BRIEF DESCRIPTION OF THE DRAWINGS

The components of the drawings are not necessarily drawn to scale, the emphasis instead being placed upon clearly illustrating the principles of an electronic device. Moreover, in the drawings, like reference numerals designate corresponding parts throughout several views.

DETAILED DESCRIPTION

Figure 1:
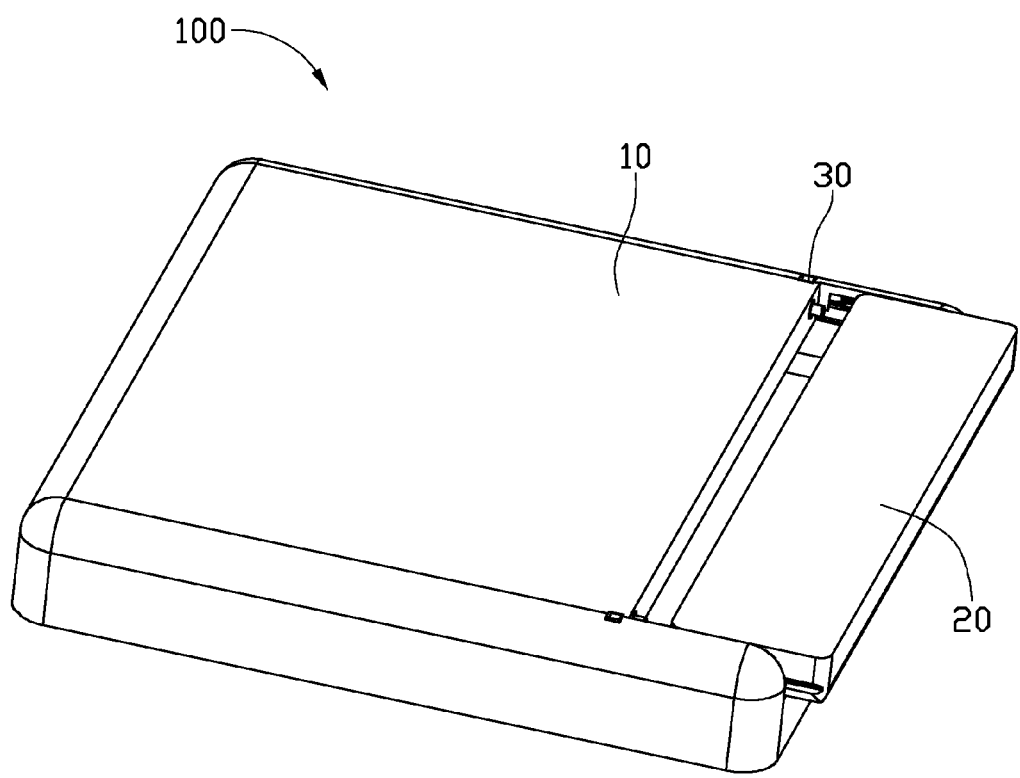
FIG. 1 is an isometric view of an electronic device in accordance with an exemplary embodiment.

Referring to FIG. 1, an embodiment of an electronic device 100 is illustrated. The electronic device 100 includes a main body 10, a battery 20, and at least one latching assembly 30 configured to latch the battery 20 to the main body 10. In this embodiment, there are two latching assemblies 30.

Figure 2:
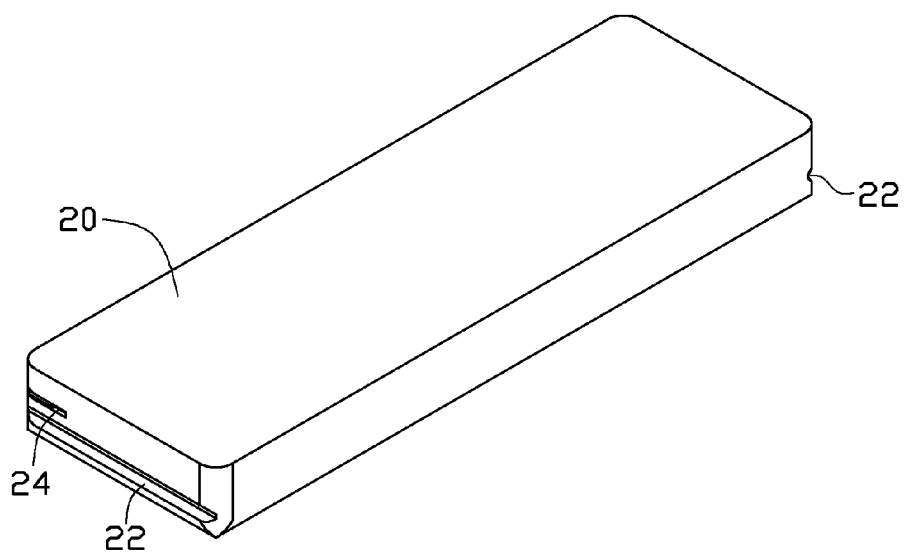
FIG. 2 is an isometric view of a battery of the electronic device of FIG. 1.

Referring to FIG. 2, each of two opposite sidewalls of the battery 20 defines a guide slot 22 substantially perpendicular to a longitudinal side of the battery 20 and a positioning hole 24 arranged over the guide slot 22.

Figure 3:
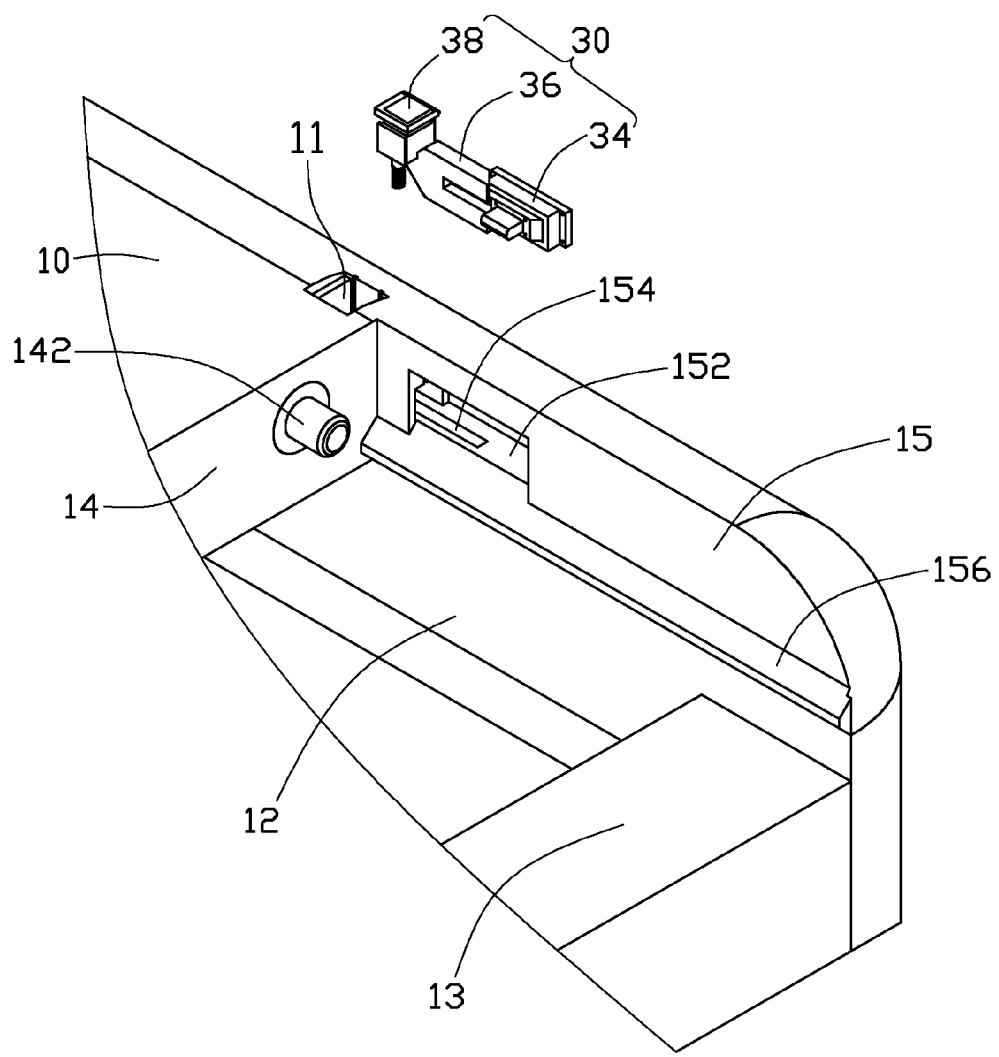
FIG. 3 is a partial, exploded, perspective view of the electronic device of FIG. 1, showing a latching assembly of the electronic device.

Referring also to FIG. 3, the main body 10 defines two receiving bays 11 and a battery compartment 12 to receive the battery 20. The battery compartment 12 includes an opening 13, a sidewall 14 opposite to the opening 13 and two opposite sidewalls 15 connected to the sidewall 14. At least one elastic protrusion 142 protrudes from the sidewall 14 and is received in the battery compartment 12. In this embodiment, two elastic protrusions 142 are deployed. The number and arrangement of the elastic protrusions 142 can vary according to need. Each sidewall 15 defines a receiving space 152 communicating with the battery compartment 12 and one receiving bay 11. The bottom of each receiving space 152 defines a sliding slot 154 with an end adjacent to one receiving bay 11. A guide rail 156 protrudes from each sidewall 15 and extends along a longitudinal side of the sidewall 15. Each guide rail 156 can be received in one guide slot 22.

The latching assemblies 30 have the same components arranged in the same manner and one latching mechanism 30 is described in detail as follows. The latching assembly 30 includes an elastic latching member 34, a resisting member 36, and a button 38. The elastic latching member 34 is mounted in the receiving space 152 and partially received in the battery compartment 12. The resisting member 36 is received in the receiving space 152 and able to slide in the sliding slot 154. The resisting member 36 abuts the elastic latching member 34. The button 38 is mounted in the receiving bay 11 and biases the resisting member 36.

In this embodiment, upon entry of the battery 20 into the battery compartment 12, the battery 20 compresses the elastic latching members 34 and the elastic protrusions 142. As the battery 20 approaches a position where each positioning hole 24 aligns with one elastic latching member 34, each elastic latching member 34 rebounds to be received in one positioning hole 24. At this point, the battery 20 is latched to the main body 10. When pressing the buttons 38, the resisting members 36 are slid towards the elastic latching members 34, moving the elastic latching members 34 away from the battery compartment 12 until respectively withdrawn from the positioning holes 24. At this point, the elastic protrusions 142 rebound to impel the battery 20 to a position partially out of the battery compartment 12, from which the battery 20 can be removed.

Figure 4:
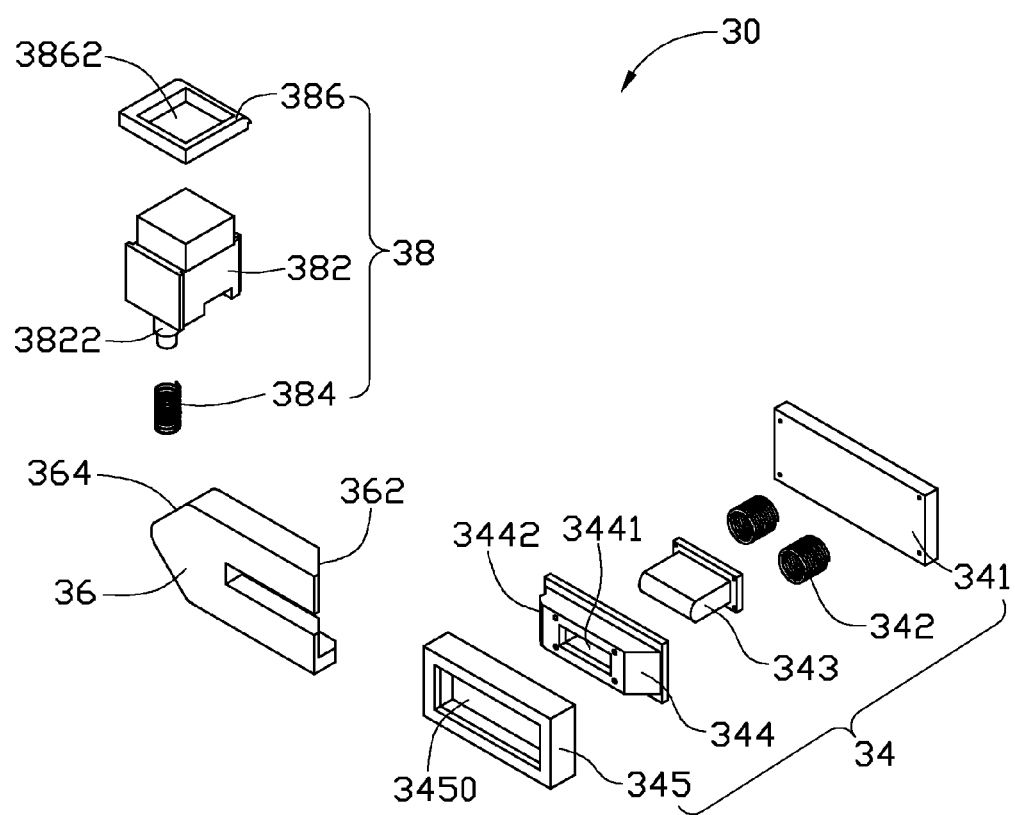
FIG. 4 is an exploded, perspective view of the latching assembly of FIG. 3.
Figure 5:
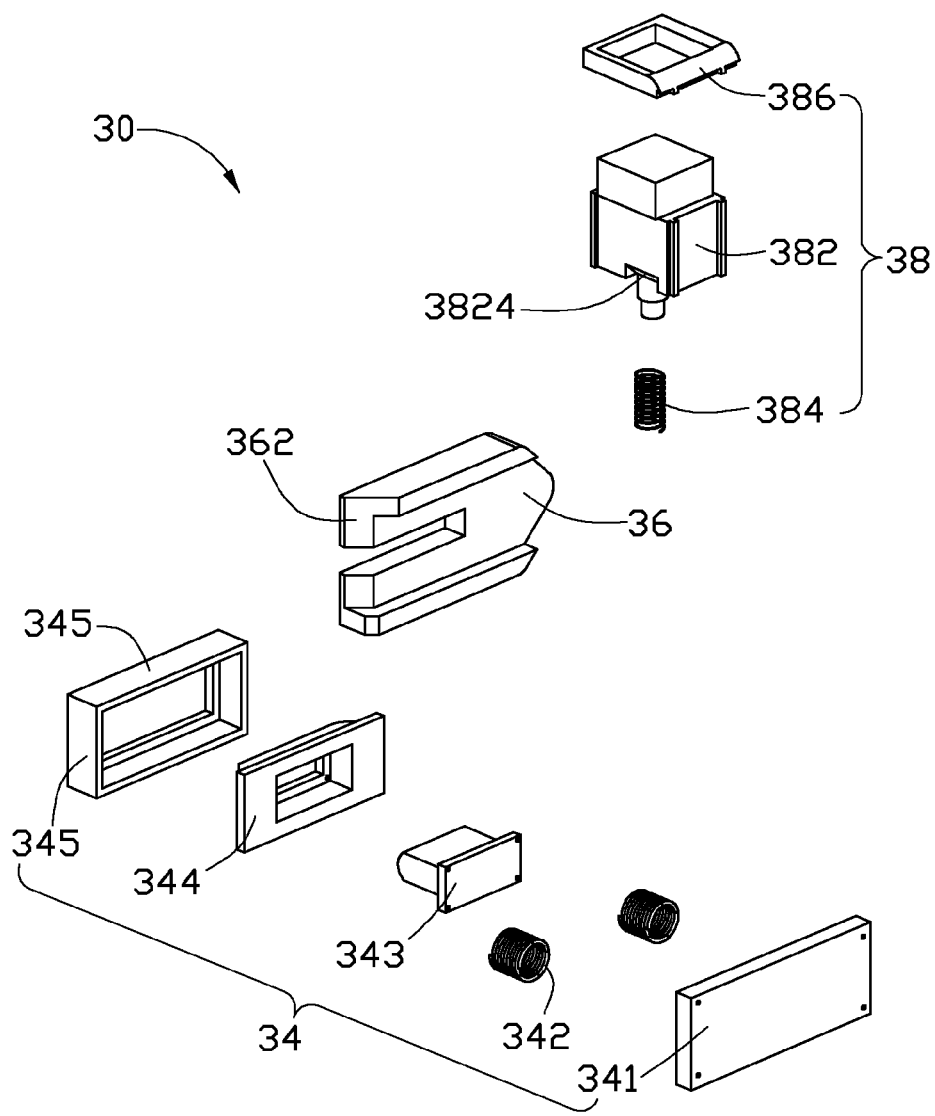
FIG. 5 is another exploded, perspective view of the latching assembly of FIG. 3 from another viewpoint.

Referring to FIGS. 4-5, the elastic latching member 34 includes a positioning plate 341, at least one elastic member 342, a latching block 343, a moveable frame 344, and a limiting frame 345. The positioning plate 341 is secured to a sidewall of the receiving space 152 facing the battery compartment 12. In this embodiment, two elastic members 342 are deployed, each a coil spring. One end of each elastic member 342 is attached to the positioning plate 341, and an opposite end is attached to the latching block 343. The moveable frame 344 defines a through hole 3441. The latching block 343 is secured to the moveable frame 344 and extends partially out of the through hole 3441. The extending portion of the latching block 343 is received in the battery compartment 12 and can be received in the positioning hole 24. The moveable frame 344 includes an angled sidewall 3442 abutting the resisting member 34. The limiting frame 345 is secured to the positioning plate 341 and defines a through hole 3450. The moveable frame 344 and the latching block 343 are movably received in the through hole 3450.

The resisting member 36 includes two opposite angled sidewalls 362, 364. The sidewall 362 abuts the sidewall 3442, and the sidewall 364 abuts the button 38.

The button 38 includes a contact member 382, an elastic member 384, and a limiting member 386. The contact member 382 includes a rod 3822. The elastic member 384 is arranged over the rod 3822. The contact member 382 further includes an angled sidewall 3824 abutting the angled sidewall 364. The limiting member 386 is secured to a top of the receiving bay 11 and defines a through hole 3862 communicating with the receiving bay 11. The contact member 382 is movably received in the receiving bay 11 and is operable through the through hole 3862.

To latch the battery 20 to the main body 10, the battery 20 is partially placed in the battery compartment 12 through the opening 13 and each guide rail 156 is partially placed in one guide slot 22. The battery 20 is then pushed towards the sidewall 14 to compress the elastic protrusions 142 and press the latching blocks 343. As the latching blocks 343 are pressed, the elastic members 342 are compressed. As the battery 20 approaches a position where each positioning hole 24 aligns with one latching block 343, the elastic members 343 rebound to cause each latching block 343 to be received in one positioning hole 24. At this point, the battery 20 is latched to the main body 10.

For removal of the battery 20, the contact members 382 are pressed to compress the elastic members 384 and cause the angled sidewalls 3824 to resist the angled sidewalls 362, driving the resisting members 36 to slide towards the elastic latching members 30. The sliding of the resisting members 36 causes the angled sidewalls 362 to resist the angled sidewalls 3442, driving the latching blocks 343 and the moveable frames 344 to move towards the positioning plates 341. As the latching blocks 343 are driven out of the positioning holes 24, the elastic protrusions 142 rebound to impel the battery 20 to a position where a part thereof protrudes from out of the battery compartment 12. At this point, the battery 20 can be removed. The contact members 382 are then released, and the elastic members 384 rebound to return the contact members 382 to their original state. Simultaneously, the elastic members 342 rebound to return the latching blocks 343 and the moveable frames 344 to their original state, and the angled sidewalls 3442 resist the angled sidewalls 362 to return the resisting members 36 to their original state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
    a battery, at least one sidewall defining a positioning hole;
    a main body defining a battery compartment to receive the battery, the battery compartment comprising an opening and at least one first sidewall adjacent to the opening; and
    at least one latching assembly for latching the battery to the main body, each of the at least one latching assembly comprising:
    an elastic latching member mounted in the first sidewall and partially received in the battery compartment, wherein, the elastic latching member comprises a moveable frame, a positioning plate, at least one elastic member, and a latching block, the positioning plate is fixed in the first sidewall, one end of each of the at least one elastic member is attached to the positioning plate, and an opposite end of each of the at least one elastic member is attached to the latching block, the latching block is secured to and extends partially out of the moveable frame, the extending portion of the latching block is received in the battery compartment and receivable in the at least one positioning hole, the moveable frame comprises a first angled sidewall;
    a resisting member movably mounted in the first sidewall and abutting the elastic latching member, wherein, the resisting member comprises a second angled sidewall and a third angled side wall opposite to the second angled sidewall and abutting the first angled sidewall; and
    a button mounted in the main body and abutting the resisting member, wherein, the button comprises a fourth angled sidewall abutting the second angled sidewall;
    wherein, when pushing the battery into the battery compartment through the opening, the elastic latching member is compressed by the battery, as the battery is pushed to a position where the at least one positioning hole aligns with the elastic latching member, the elastic latching member restores to be received in the at least one positioning hole; when pressing the button, the resisting member is driven to move towards the elastic latching member, causing the elastic latching member to move away from the battery compartment until the elastic latching member moves out of the at least one positioning hole, when the button is released, the elastic latching member restores to be partially received in the battery compartment, and to resist the resisting member to return to its original position.

2. The electronic device as described in claim 1, wherein the elastic latching member further comprises a limiting frame secured to the positioning plate and defining a through hole, the latching block and the moveable frame are moveably received in the through hole.

3. The electronic device as described in claim 1, wherein each of the at least one elastic member is a coil spring.

4. The electronic device as described in claim 1, wherein the button comprises a contact member and an elastic element arranged over the contact member.

5. The electronic device as described in claim 1, wherein the button further comprises a limiting element configured to prevent the contact member from moving out of the main body.

6. The electronic device as described in claim 1, further comprising at least one elastic protrusion, wherein the battery compartment further comprises a second sidewall opposite to the opening, the at least one elastic protrusion protrudes from the second sidewall and is received in the battery compartment.

7. The electronic device as described in claim 1, wherein each of the at least one first sidewall defines a guide rail extending along a longitudinal side of each of the at least one first sidewall, the battery further defines at least one guide slot, each of the at least one guide slot is arranged below one of the at least one positioning hole, and each of the at least one guide rail is receivable in one of the at least one guide slot.

* * * * *